S. WOHLFELD.
AUTOMOBILE TIRE TRUNK.
APPLICATION FILED OCT. 1, 1909.
973,329.
Patented Oct. 18, 1910.
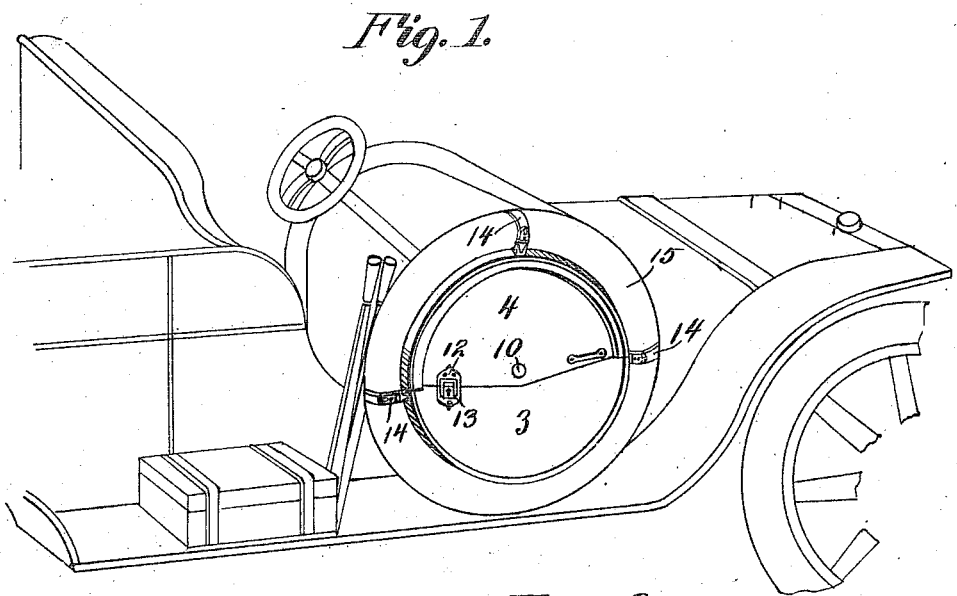
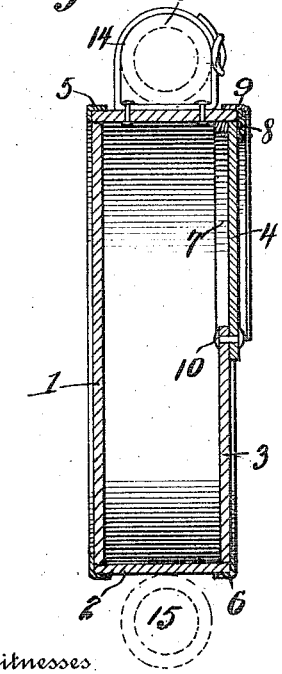
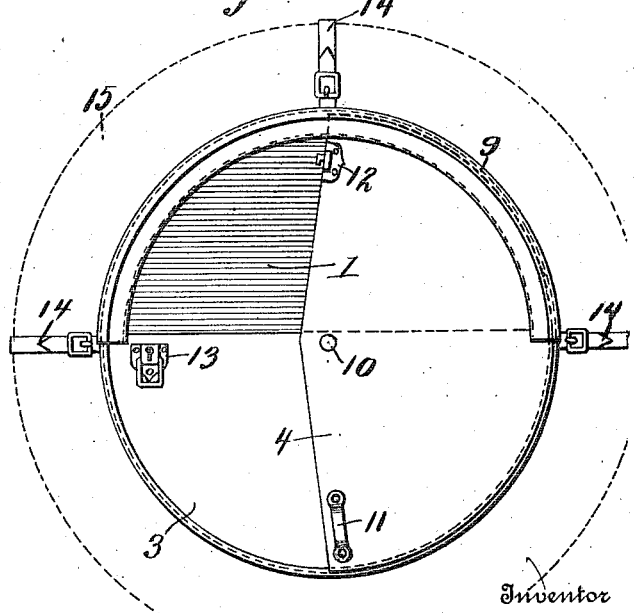
Witnesses
William C. Linton.
V. B. Hillyard.
Inventor
Samuel Wohlfeld.
By Victor J. Evans
Attorney

UNITED STATES PATENT OFFICE.

SAMUEL WOHLFELD, OF PHILADELPHIA, PENNSYLVANIA.

AUTOMOBILE-TIRE TRUNK.

973,329.     Specification of Letters Patent.     Patented Oct. 18, 1910.

Application filed October 1, 1909. Serial No. 520,451.

*To all whom it may concern:*

Be it known that I, SAMUEL WOHLFELD, a citizen of the United States, residing at Philadelphia, in the county of Philadelphia and State of Pennsylvania, have invented new and useful Improvements in Automobile-Tire Trunks, of which the following is a specification.

In the operation of automobiles, particularly such as are intended for touring, it is desirable to provide a receptacle for receiving clothing and sundry articles and since it is found necessary to equip the machine with extra tires it has been suggested to utilize the space inclosed by the tire for receiving a case or receptacle in which the clothing may be placed. Such receptacles or cases are generally designated in the trade as tire trunks and have not been universally adopted because not proof against the ingress of moisture and dust.

The present invention is designed to provide a tire trunk of the character aforesaid, which while involving a simple and durable construction also provides a tight joint between the closure and the body of the trunk so as to exclude rain or moisture and prevent the entrance of dust, thereby affording protection for the clothing or other articles stored within the trunk.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 illustrates in perspective the outline of an automobile provided with a tire and a tire trunk embodying the invention. Fig. 2 is a vertical central section of the tire trunk, showing the position of the extra tire by dotted lines. Fig. 3 is a front view of the trunk with the closure partly open and showing the tire by dotted lines.

Corresponding and like parts are referred to in the following description, and indicated in all the views of the drawing, by the same reference characters.

The trunk is of circular outline in elevation and of a diameter to fit in the extra tire usually provided upon an automobile. The trunk is of a width approximating the diameter of a cross section of the tire so as not to extend too far in the front or in the rear of the tire when placed in position, as indicated most clearly in Fig. 2. The body of the trunk includes a back 1, a rim 2 and a front, the latter comprising a lower portion 3, which is fixed, and an upper portion 4, which is movable and constitutes the closure. The parts may be constructed of any material best adapted for the purpose and according to the cost and finish of the article. The back 1 is usually stout, being of wood, whereas the rim 2 may be of leather, press board or other thin material bent into circular outline and secured to the back 1, the joint being protected and reinforced by means of a binding 5. The lower fixed portion 3 of the front is of semicircular form and secured to the lower front edge of the rim 2 in any substantial way, a binding 6 protecting and reinforcing the joint. An arch 7 is secured to the upper front portion of the rim upon the inner side thereof and serves to strengthen and brace the same opposite the opening which is closed by the board 4. The arch 7 also forms an inner support for the closure 4 and may be a part of the front 3 or be separate therefrom and secured to the rim 3 in any substantial way. A flap 8 of arch form is secured to the front edge of the upper portion of the rim 2 opposite the opening in the front and serves to prevent outward displacement of the closure 4. A binding 9 protects and reinforces the joint formed between the flap 8 and the rim 2. The arch 7 and flap 8 are spaced apart a distance corresponding to the thickness of the closure 4 so as to receive the outer edge portion of the latter between them, thereby confining the upper outer edge of said closure when moved to closed position.

The closure 4 is approximately of semicircular form and is pivoted to the fixed part 3 of the front at 10 so as to turn about said pivot fastening as a center. A handle 11 is provided near one end of the closure and a catch 12 is secured to the opposite end thereof and is adapted to coöperate with a lock 13 secured to the fixed part 3 of the front. When the closure 4 is moved to a position opposite the fixed part 3 of the front the upper portion of said front is wholly uncovered, thereby admitting of access being readily had to the interior of the trunk either to place clothing or other articles therein or to remove the same therefrom. When the closure 4 is shut the front of the trunk is entirely covered and the lower edge portion of the closure overlaps the upper edge portion of the fixed part 3 of the front, thereby shedding water and preventing entrance of the same into the trunk. The flap 8 also extends over the upper or outer portion of the closure and likewise serves to shed water and prevent moisture entering the trunk. The closure fits the fixed part 3 of the front and the upper portion of the rim sufficiently tight to exclude moisture and dust, thereby affording protection for the contents of the trunk both against moisture and dust. The trunk is provided at intervals in its circumferential length with straps 14 or other means for securing the same to the tire 15 when in position.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A tire trunk comprising a circular rim, a back secured to the rear edge of the rim and closing the same, a front of approximately semicircular form secured to the lower front edge of the rim, an arch in the plane of the front secured to the inner wall of the upper front portion of the rim a short distance from the forward edge thereof, an arch-shaped flap secured to the front edge of the rim opposite the said arch and spaced from the latter, and a closure pivoted to the outer side of the said front and adapted to operate in the space formed between the said arch and flap, the lower portion of the closure overlapping the upper edge portion of the front when said closure occupies a position to cover the opening in the upper front portion of the trunk.

2. A tire trunk comprising a circular rim of flexible material, a back of stiff material secured to the rear edge of the rim and closing the latter, a binder secured to the adjacent edge portions of the back and rim and overlapping the joint formed between them, a front of stiff material of approximately semicircular form secured to the lower front edge of the rim, a binder attached to the adjacent edge portions of the front and rim and covering the joint formed between them, an arch in the plane of the front secured to the inner wall of the upper front portion of the rim a short distance from the forward edge thereof, an arch-shaped flap secured to the front edge of the rim opposite said arch and spaced from the latter, a binder secured to the edge portions of said flap and rim and extending over the joint formed between them, and a closure pivoted to the outer side of said front and adapted to operate in the space formed between the said arch and flap, the lower portion of the closure overlapping the upper edge portion of the front when said closure occupies a position to cover the opening in the upper front portion of the trunk.

In testimony whereof I affix my signature in presence of two witnesses.

SAMUEL WOHLFELD.

Witnesses:
MAX HIRSCH,
DELLA SIMON.